(12) United States Patent  (10) Patent No.: US 7,699,734 B2
Lohrentz  (45) Date of Patent: Apr. 20, 2010

(54) DRIVE BELT REMOVAL APPARATUS IN CONFINED SPACES

(75) Inventor: Randy Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 416 days.

(21) Appl. No.: 11/685,331

(22) Filed: Mar. 13, 2007

(65) Prior Publication Data

US 2009/0113865 A1 May 7, 2009

(51) Int. Cl.
*F16H 55/36* (2006.01)
(52) U.S. Cl. .................. 474/174; 474/120; 474/119
(58) Field of Classification Search ............ 56/14.4, 56/224; 414/172, 120, 119, 121, 122, 130, 414/101, 66, 114, 112, 134; 29/426.1, 892.2, 29/892.3, 29, 892; D8/360
See application file for complete search history.

(56) References Cited

U.S. PATENT DOCUMENTS

| 268,763 | A | * | 12/1882 | Woodward | ................. 474/120 |
| 275,947 | A | | 4/1883 | Sanborn | |
| 649,147 | A | * | 5/1900 | Towse | ................. 474/120 |
| 920,519 | A | * | 5/1909 | Baker | ................. 474/66 |
| 1,431,374 | A | | 10/1922 | Cullman | |
| 2,195,359 | A | * | 3/1940 | Coe et al. | ................. 474/130 |
| 2,769,297 | A | | 11/1956 | Orelind et al. | |
| 2,913,915 | A | * | 11/1959 | Russ | ................. 474/120 |
| 3,401,511 | A | | 9/1968 | Weakley et al. | |
| 3,561,203 | A | | 2/1971 | Hurlburt | |
| 3,958,400 | A | | 5/1976 | Sorensen et al. | |
| 3,982,383 | A | * | 9/1976 | Mott | ................. 56/11.6 |
| 4,091,602 | A | * | 5/1978 | Williams et al. | ............ 56/14.4 |
| 4,372,103 | A | * | 2/1983 | McIlwain et al. | ............ 56/14.4 |
| 4,735,036 | A | | 4/1988 | Alexander | |
| 6,692,391 | B2 | * | 2/2004 | Gerring et al. | .............. 474/130 |
| D492,579 | S | * | 7/2004 | Hodjat | ................. D8/360 |

* cited by examiner

Primary Examiner—Árpád Fábián-Kovács
(74) Attorney, Agent, or Firm—Hovey Williams LLP

(57) ABSTRACT

An apparatus and method are disclosed for efficiently removing a belt from a drive assembly of an agricultural implement in which a flywheel and a header framework cooperatively define a gap therebetween which is smaller than a cross-sectional dimension of the belt and thereby prevent the belt from being simply passed through the gap and removed from the remaining components of the drive assembly. A radially inwardly extending notch in the periphery of the flywheel is configured and dimensioned to allow a portion of the belt to be received within the notch. The notched flywheel, with the portion of the belt received in the notch, is rotatable such that the portion of the belt is moveable past the gap to thereby permit the belt to be removed from the remaining components of the drive assembly in the distal direction without requiring the removal of either the flywheel or the framework.

18 Claims, 9 Drawing Sheets

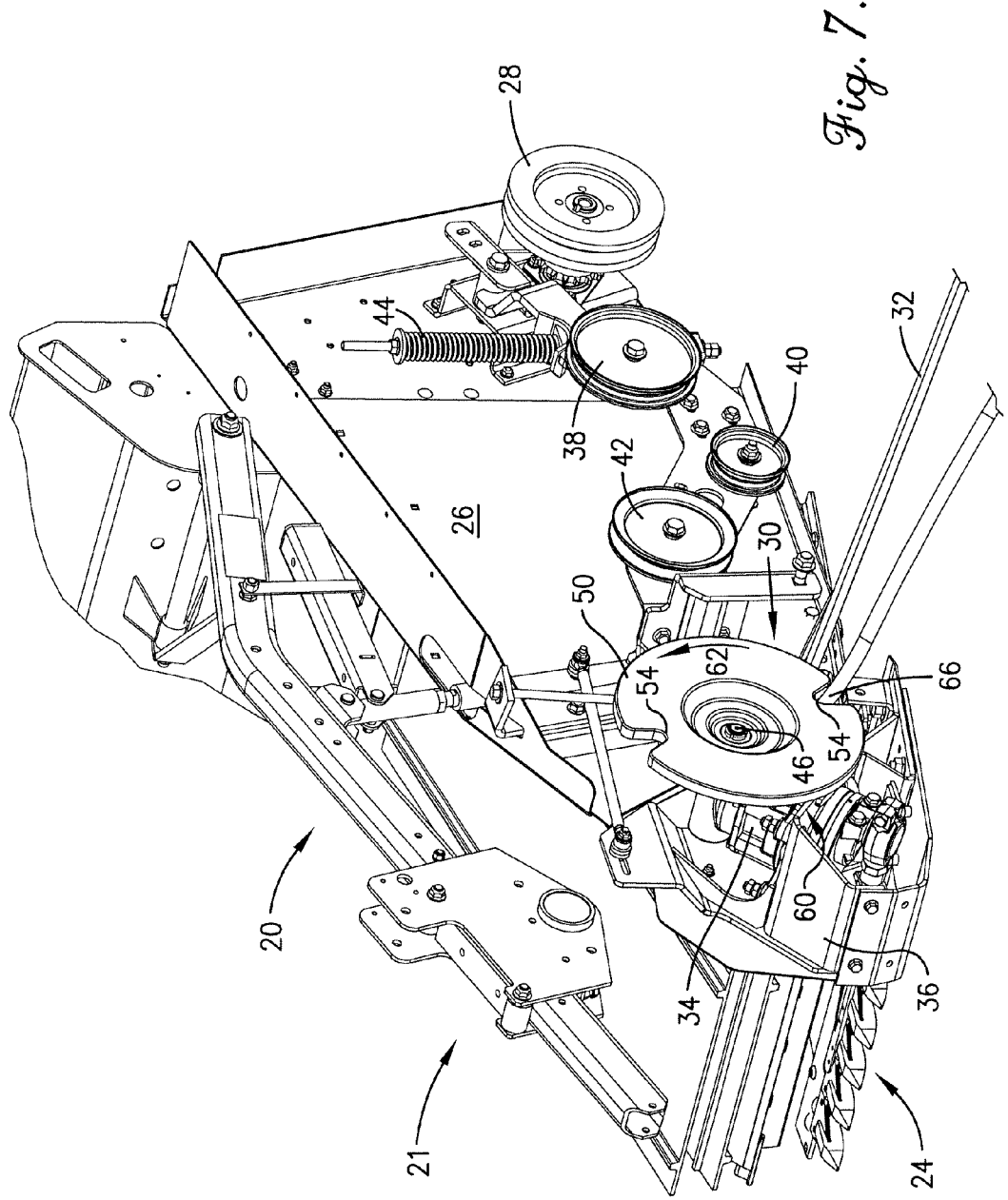

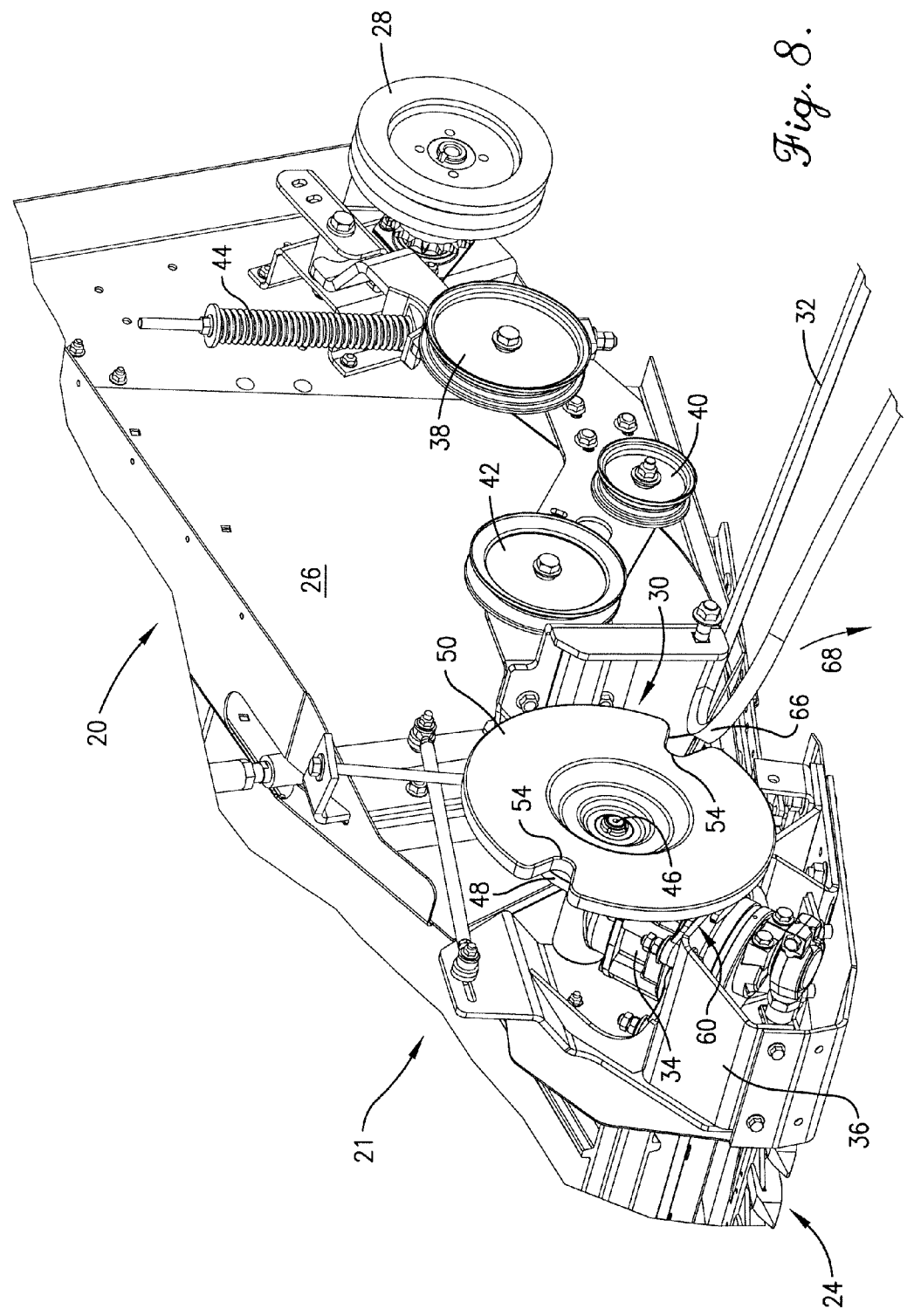

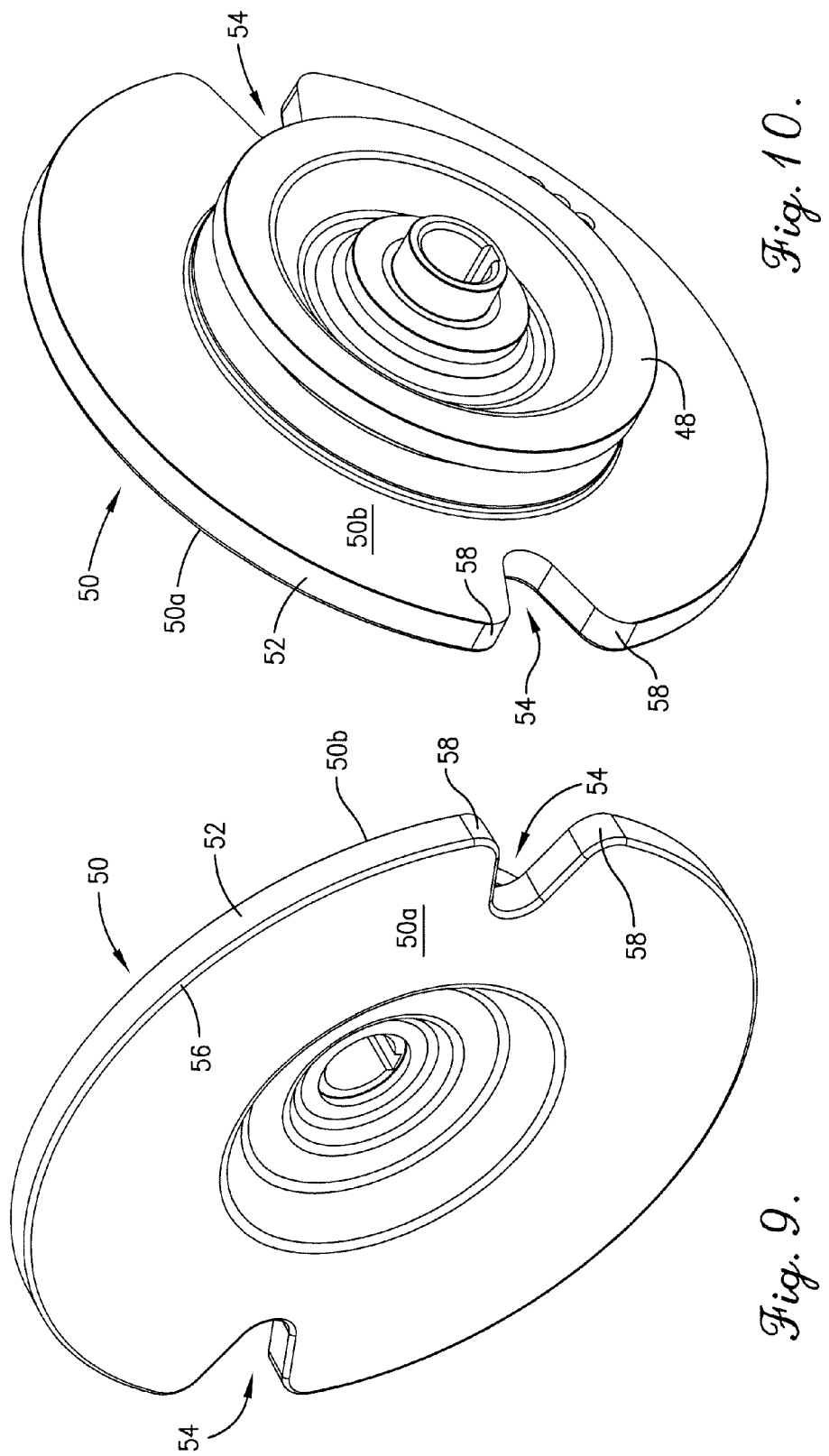

DRIVE BELT REMOVAL APPARATUS IN CONFINED SPACES

TECHNICAL FIELD

The present invention relates generally to agricultural implements having a driveable mechanism and, more particularly, to a method and apparatus for removing an endless element from a drive operable to supply power to the driveable mechanism.

BACKGROUND AND SUMMARY

Agricultural implement drives often include an endless element (e.g., a belt or chain) that must be replaced or removed for maintenance purposes. Because of the confined spaces in which drives are typically located, the removal of the endless element is often an inefficient and time consuming process. For example, the drive is often situated so that one or more components must be removed in order to access the endless element. One particularly problematic arrangement involves an endless element that is located inboard of a rotating member (such as a flywheel), wherein a component cooperates with the rotating member to prevent outboard removal of the endless element without taking the rotating member off of its supporting shaft.

The present invention provides a novel method and apparatus to overcome this problem and provide for the more efficient removal of an endless element from a drive through a confined space without necessarily removing other parts of the drive or implement. In one aspect of the present invention, a rotating member is provided with a peripheral notch so that at least a portion of the cross-section of the endless element can be placed therein to clear a narrow gap defined between the rotating member and another component. As the rotating member is rotated with the portion of the endless element received in the notch, the endless element can be moved past the interfering obstruction (defined at the gap) and separated from the rest of the drive without having to remove the rotating member.

Various aspects and advantages of the present invention will be apparent from the following detailed description of the preferred embodiments and the accompanying drawing figures.

BRIEF DESCRIPTION OF THE DRAWINGS

A preferred embodiment of the invention is described in detail below with reference to the attached drawing figures, wherein:

FIG. 7 is a fragmentary perspective view of the harvesting header similar to FIG. 6, but illustrating the flywheel further rotated so that the belt has cleared the narrow gap entirely;

FIG. 8 is a fragmentary perspective view of the harvesting header similar to FIG. 7, but depicting the portion of the cross-section of the belt having been removed from the notched flywheel as the belt is separated from the remaining components of the drive assembly;

FIG. 9 is a perspective view of the distal side of the notched flywheel and drive pulley of the belt drive assembly; and FIG. 10 is a perspective view of the proximal side of the notched flywheel and drive pulley of the belt drive assembly.

Figure 1:
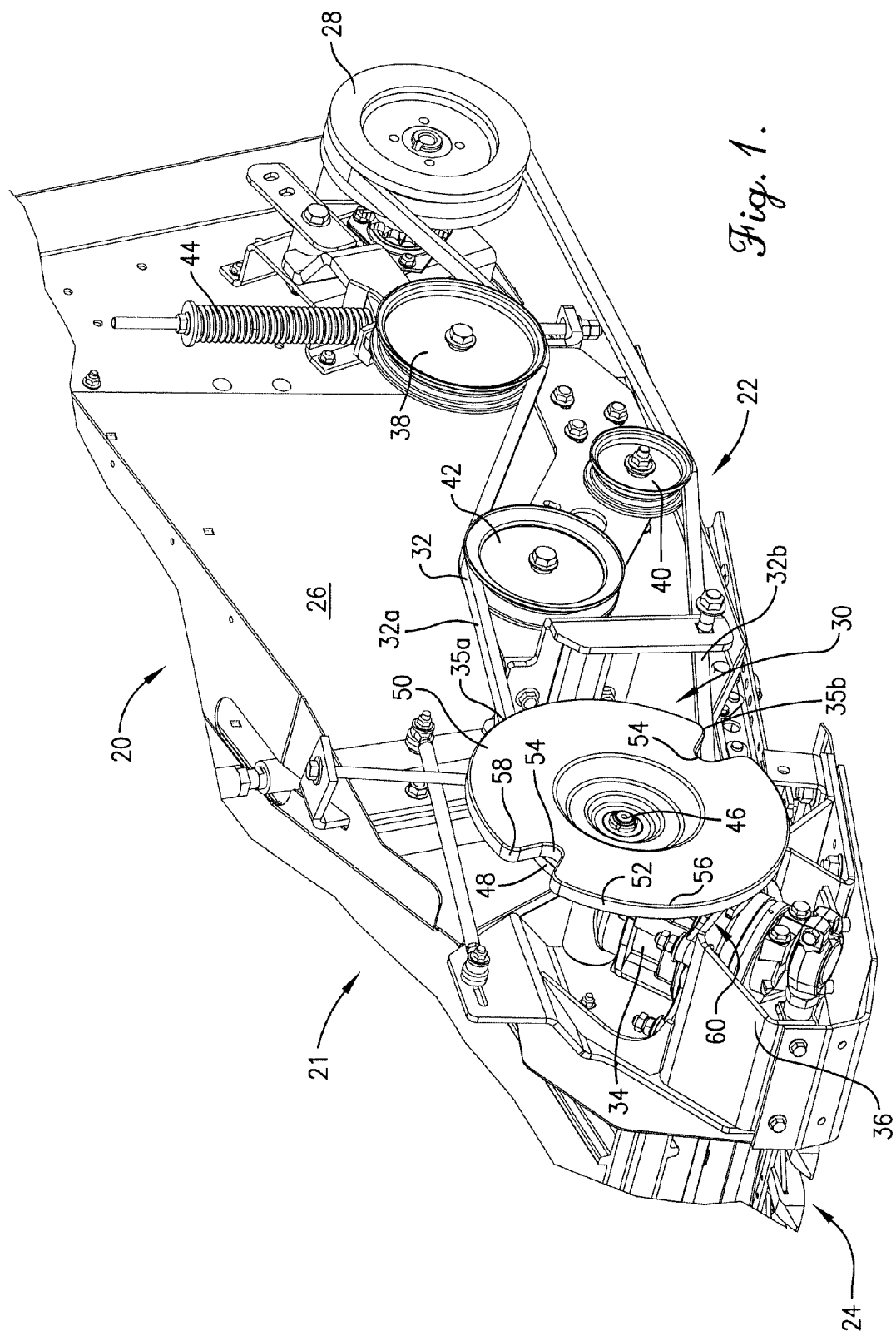
FIG. 1 is a fragmentary perspective view of a harvesting header with a belt drive assembly constructed in accordance with the principles of a preferred embodiment of the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, the agricultural implement 20 selected for illustration includes a harvester header denoted by the numeral 21. The agricultural implement 20 could be self-propelled (such as a combine), or a pull-type implement towed by a separate prime mover (such as a tractor). The header 21 includes a drive assembly 22 and an operating mechanism in the form of a sickle assembly 24. In the illustrated embodiment, header 21 includes a side wall 26. The drive assembly 22 extends alongside the wall 26 and is at least partly supported thereon. The principles of the present invention are equally applicable to other forms of agricultural implements. That is to say, it is entirely within the ambit of the present invention to incorporate the principles on agricultural implements with other types of headers, or not harvesting header at all. For example, the principles of the present invention are equally applicable to a round baler, a square baler, a windrower, or similar agricultural implement having a drive assembly configured to power an operating mechanism that performs operations as the implement moves across a field.

A driving pulley 28 is associated with a power source (not shown), which could take the form of an engine, hydraulic motor, power take-off, or the like. The drive assembly 22 transmits power from the driving pulley 28 through a rotating assembly 30 to actuate the operating mechanism. The mechanism illustrated takes the form of a sickle assembly 24, although other types of operating mechanisms are within the ambit of the present invention. For example, the operating mechanism could alternatively comprise a rotary cutter bed, a windrowing mechanism, or other header-mounted mechanism. Again, the principles of the present invention are also applicable to other types of agricultural equipment. It is only necessary that the equipment be provided with an operating mechanism powered by a drive assembly. In the illustrated embodiment, the rotating assembly 30 transfers power to the sickle assembly 24 through a right angle gearbox 34. The gearbox 34 is mounted to header framework 36 projecting from the wall 26.

Driving pulley 28 is preferably fixed to a shaft rotatably supported by the wall 26 of the header 21 and powered by a prime mover (not shown). The power from the driving pulley 28 is transmitted through a drive belt 32 carried on the drive assembly 22 to drivingly interconnect the driving pulley 28 and the rotating assembly 30. While the illustrated embodiment discloses a belt 32, it will be appreciated by those of ordinary skill in the art that belt 32 could alternatively take the form of a v-belt, a notched belt, a linked chain, or any similar endless element to drivingly interconnect the driving pulley 28 and the rotating assembly 30, without departing from the principles of the present invention. The belt 32 is generally located within an operating plane 33 when the belt 32 is drivingly interconnecting the driving pulley 28 and the rotating assembly 30.

In the illustrated embodiment, drive assembly 22 also includes idler pulleys 38, 40, and 42 which help maintain the belt 32 generally within the operating plane 33. In the illustrated embodiment, idler pulleys 38, 40, and 42 are rotatably supported by the wall 26 of the harvester header 21. The belt 32 is maintained on the drive assembly 22 in a taut condition by tension introduced by a spring 44, which cooperates with idler pulley 38 to apply tension to the belt 32.

It is to be emphasized that the illustrated drive assembly 22 is disclosed by way of example only and that the components comprising the illustrated drive assembly 22 could be altered in various ways without departing from the principles of the present invention. For example, the number of idler pulleys could be more or fewer than shown in the illustrated embodiment, or the drive could comprise multiple belts for drivingly interconnecting multiple mechanisms. Likewise, the drive assembly could be oriented in a horizontal operating plane, or components of the drive assembly could be supported on structure other than the wall 26. The alternative arrangements of the drive assembly enumerated above are by way of example only, but serve to demonstrate that it is entirely within the ambit of the present invention to include such alterations and that the principles of the present invention could be incorporated equally advantageously into such drive assembly arrangements.

In the preferred embodiment, the rotating assembly 30 includes a stub shaft 46, a drive element in the form of a driven pulley 48, and a flywheel 50, each fixed to the stub shaft 46 for rotation therewith. The stub shaft 46 extends outwardly past the wall 26 of the header 21 to present spaced apart proximal and distal ends. In the illustrated embodiment, the stub shaft 46 protrudes from the right angle gearbox 34 and rotates to transfer power from the rotating assembly 30 to the gearbox 34. While the exemplary embodiment illustrated discloses the stub shaft 46 supported by the gearbox 34, the stub shaft 46 could alternatively be supported at least partly by the wall 26. The stub shaft 46 could alternatively be supported by other structure inboard of the wall 26 and simply extend through the wall 26. Turning to FIGS. 9 and 10, the driven pulley 48 and flywheel 50 are illustrated in the preferred construction as integrally formed. However, such construction is not necessary as the driven pulley 48 and flywheel 50 could alternatively be formed as separate components and could additionally be spaced apart without departing from the principles of the present invention.

Figure 2:
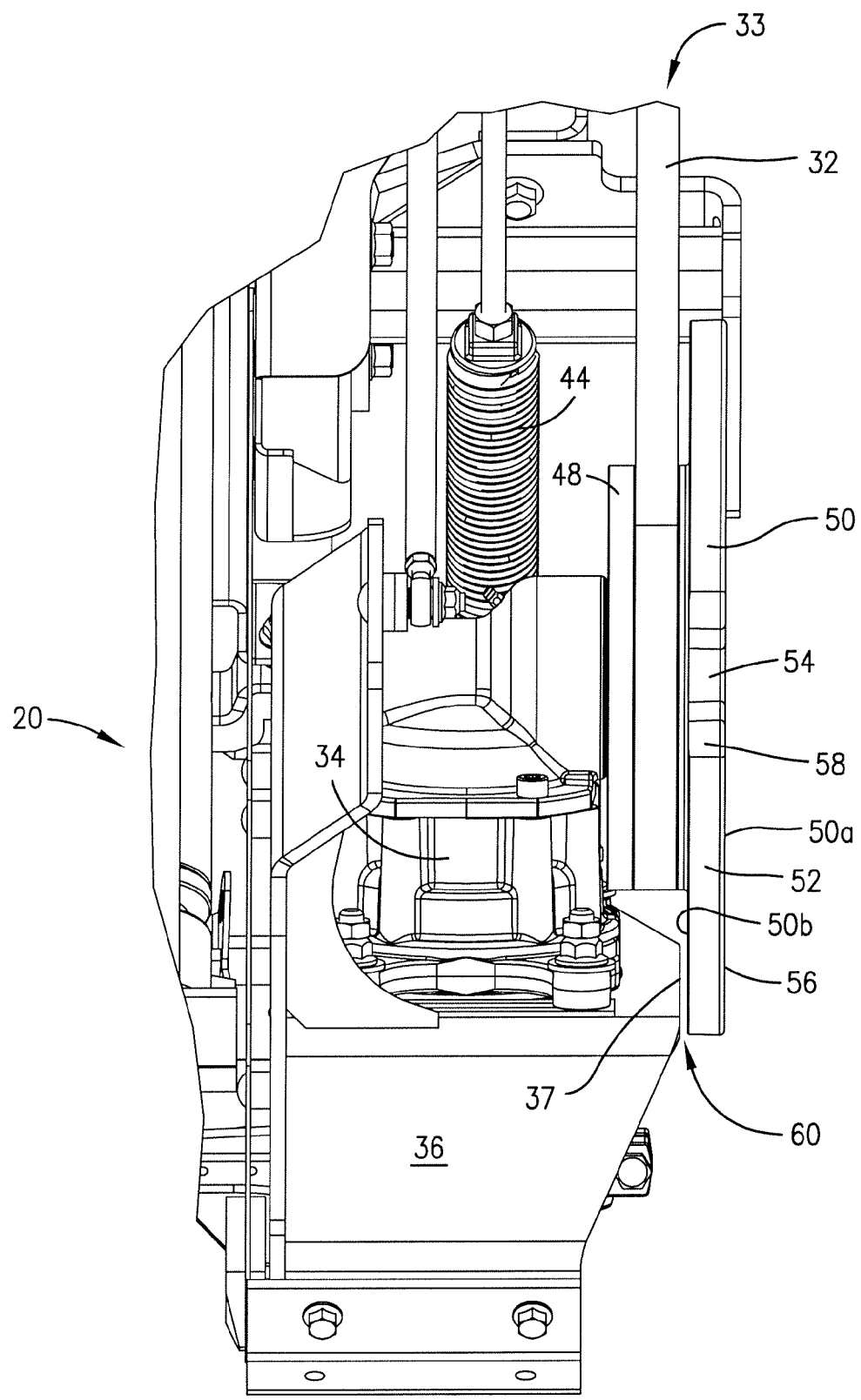
FIG. 2 is a fragmentary top plan view of the front portion of the belt drive assembly shown in FIG. 1, particularly illustrating the narrow gap created between a flywheel and closely spaced header framework.

More particularly, the driven pulley 48 is fixed relative to the stub shaft 46 so as to be spaced between the proximal and distal ends of the stub shaft 46 (see FIGS. 1 and 2). It is noted that the form of the drive element is not critical to the present invention, but only that it take a form to cooperate with the endless element in the function of transferring power through the drive assembly 22. The flywheel 50 is also fixed relative to the stub shaft so as to be positioned distally from the driven pulley 48 (see FIGS. 1 and 2). In a preferred embodiment, the flywheel 50 serves to reduce vibration in the rotating assembly 30 introduced by reciprocal motion of the driven sickle assembly 24. It is emphasized that the flywheel 50 is provided by way of example only and that it could take the form of any rotating member, such as another pulley or sheave, without departing from the spirit of the present invention.

While in the illustrated embodiment, the driven pulley 48 and, more particularly, the flywheel 50 are presented as circular elements, each could be non-circular (e.g., polygonal) shapes, although circular is the most preferred shape. Also in the illustrated embodiment, the flywheel 50 has a diameter larger than that of the driven pulley 48.

As well understood by those of ordinary skill in the art, belt 32 must occasionally be removed from the other components of the drive assembly 22 for purposes of maintenance or replacement. For some cases, it would be sufficient to merely loosen belt 32 from the driving pulley 28 and the driven pulley 48, such as by laterally moving an idler pulley 38 to allow slack in the belt drive assembly 22. However, particularly for the matter of belt replacement, it is necessary that belt 32 not only be loosened, but removed entirely from the remaining components of the drive assembly 22. This removal requires an ability to separate belt 32 from all elements of the drive assembly 22 and move the belt 32, in its entirety, away from the header 21 so that a new belt could be installed.

Practically speaking, as is clear to those skilled in the art, structure will often dictate how the belt 32 is able to be most efficiently removed from the other components of the drive assembly 22. In the illustrated embodiment, structure comprising any or all of the header 21, header wall 26, sickle assembly 24, or gearbox 34, generally prevents removal of the belt 32 in the proximal direction (i.e., toward the sickle assembly 24) without disassembling or structurally altering the structure. The presence of such structure, then, requires that the belt 32 be removed in the distal direction. In other agricultural implement arrangements, it may simply be more efficient or desirable to remove the belt in the distal direction rather than the proximal direction.

As with the illustrated embodiment, the construction of some agricultural machines results in the placement of a component spaced adjacent the flywheel 50 to cooperatively define a gap 60 therebetween, as illustrated particularly in the plan view of FIG. 2. When the gap 60 is smaller than a cross-section of the belt 32, removal in the distal direction is ordinarily prevented from being accomplished in an efficient manner.

In the illustrated embodiment, a margin 37 is presented at the part of the header framework 36 that is spaced closest to the flywheel 50. The position of the margin 37 relative to the flywheel 50 creates a gap 60 between the margin 37 and the proximal side of the flywheel 50b. As illustrated in particular in FIG. 2, when the dimension of the gap 60 is less than the cross-sectional dimension of the belt 32, then the belt 32 cannot be removed from the other components of the drive assembly 22 in the distal direction by simply passing the belt 32 through the gap 60. It is to be understood that, while the illustrated embodiment discloses a gap 60 created by the relative spacing of the header framework 36 and the flywheel 50, the principles of the present invention are equally applicable to a similar gap created by the relative spacing of any obstructing component and a rotating member adjacent a drive element of the drive assembly. For example, other components such as rotating pulleys, extension parts of the implement or mechanism, or the like could be spaced similarly in relation to the flywheel 50 of the illustrated embodiment to define a confining gap. It is only necessary for the gap to be created and dimensioned so as to obstruct the passage of the belt 32 through the confining gap. In this general case, the margin is defined as that part of the obstructing component that defines with the flywheel a gap that is smaller than the cross-sectional dimension of the belt.

In the disclosed embodiment, the belt 32 wraps partly around the driven pulley 48 to present two sections 32a, 32b that each extend from the driven pulley 48 along a generally linear path from the driven pulley 48 (see FIG. 1). Because, as illustrated, the diameter of the flywheel 50 is greater than the diameter of the driven pulley 48, a distal projection of these two paths onto the flywheel 50 defines two intersecting points 35a, 35b along the radially outermost circumference of the flywheel 50. In the illustrated embodiment, these two points 35a, 35b define a minor arc (positioned within the area enclosed by the track of the belt 32) along the circumference of the flywheel 50. It is to be noted, however, that alternately oriented paths of a belt could define intersecting points on the flywheel which define a major arc (positioned within the area enclosed by the track of the belt) along the circumference of a flywheel, without departing from the teachings of the present invention.

In the illustrated embodiment, the margin 37 does not extend along the distal side of the flywheel 50a (see FIG. 2). The disclosed gap 60, therefore, is positioned outside of the minor arc and impedes removal of the belt 32 from the rest of the drive assembly 22 as the belt 32 is unwrapped from the driven pulley 48 and pulled distally around the flywheel 50. In the illustrated embodiment, if a confining space were positioned inside the minor arc, such a space would not impede removal of the belt 32 from the remaining components of the drive assembly 22, as such a confining space would be within the area enclosed by the track of the belt 32 (see FIG. 1). The belt 32, then, would be simply unwrapped from the rest of the drive assembly 22 in the outward direction (i.e., away from the area of the area enclosed by the track of the belt 32), without passing through a confining gap.

Although in the illustrated embodiment, the margin 37 is positioned alongside the flywheel 50 such that the gap 60 is defined laterally of the flywheel 50 (see FIG. 2), other locations for an obstruction are possible without departing from the principles of the present invention. For example, a notch configured to allow removal of a belt past an obstruction positioned radially relative to a flywheel, or an obstruction positioned both laterally and radially relative to the flywheel, is within the ambit of the present invention. It is also noted that if an obstruction cooperatively defining a gap were to extend along the laterally distal side of the flywheel, then the resulting distal gap could be defined inside of the disclosed minor arc without departing from the teaching of the present invention.

The flywheel 50 presents an outermost periphery 52, along which a pair of radially inwardly extending peripheral notches 54 are provided. In the illustrated embodiment, the notches 54 are angularly equidistantly spaced around the periphery 52 of the flywheel 50. It is noted that the illustrated pair of notches 54 is by way of example only and that the effectiveness of the invention is not diminished by the provision of more or fewer notches 54. As will be readily apparent to those skilled in the art, any plurality of notches should preferably be angularly equidistantly spaced around the periphery 52 of the flywheel 50 so as to provide balance when the flywheel 50 is rotating during operation of the mechanism 24. In the case of a plurality of notches 54, it is preferable, although not necessary, that the preferred characteristics of the notches 54 apply uniformly to each of the notches such that all notches are congruent.

Each notch 54 is configured to receive at least a portion of a cross-section 66 of the belt 32 therein so that, upon rotation of the flywheel 50 with the portion of the belt 66 received in the notch 54, the belt 32 is moveable past the gap 60 and the margin 37, and thereafter be removeable from the remaining components of the drive assembly 22 in the distal direction. This removal of the belt 32 is efficient compared to the prior art in that it is accomplished without the removal of other components of either the header 21 or the drive assembly 22.

Each notch 54 is dimensioned to receive enough of the cross-section 66 of the belt 32 such that, as the notch 54 passes the margin 37, the notch 54 provides adequate space into which the portion of the belt 66 can be received in order to move past the gap 60. As illustrated in FIG. 2, where the margin 37 is positioned radially inwardly relative to the periphery 52 of the flywheel 50, each notch 54 is dimensioned to receive the entire cross-section 66 of the belt 32. As such, each notch 54 provides adequate space within the notch 54 to entirely receive the portion of the belt 66 independent of the space of the gap 60 (see, in particular, FIG. 6).

While in the illustrated embodiment, shown particularly in FIGS. 9 and 10, the notch 54 is v-shaped, it is emphasized that the notch 54 could take on any appropriate shape (e.g., rectangular, semicircular, etc.), such that the portion of the belt 66 could be sufficiently received therein. It is important, however, that the depth of the notch 54 extends radially inwardly relative to the margin 37 a distance at least as great as the cross-sectional dimension of the belt 32 such that the portion of the belt 66, when received in the notch 54, is moveable past the margin 37.

It is noted that while the illustrated embodiment depicts the framework 36 positioned laterally proximal relative to the flywheel 50 (see FIG. 2), such that the gap 60 is defined alongside the flywheel 50, it is within the ambit of the present invention to have an arrangement wherein the obstructing component is positioned in other locations, including radially outwardly from the flywheel 50. In such an alternative construction, the radial gap could cooperate with the notch to accommodate the belt cross-section. For example, the flywheel notch in this alternative arrangement could have a depth dimension that is at least as great as the dimension of the cross-section of the belt less the distance between the obstruction and the flywheel periphery. Such a configured flywheel notch would be effective to allow passage of the belt past the radial gap, even though the space within the notch itself may be less than required to receive the entire cross-section of the belt.

The flywheel 50 includes opposite lateral edges 56 extending along the periphery 52 of the flywheel 50. In a preferred embodiment, these lateral edges 56 are preferably, although not necessarily, radiused so as to present a rounded edge to reduce the risk of damage to the belt 32 when the portion of the belt 66 is received in the notch 54 during removal or installation. The periphery 52 of the flywheel 50 also preferably presents radiused corners or junctions 58 cooperatively defined between each notch 54 and each peripheral segment extending between the notches 54. Accordingly, the junctions 58 each present a rounded edge to reduce the risk of damage to the belt 32 when the portion of the belt 66 is received in the notch 54 during removal or installation.

Although the present invention has been illustrated and described herein in connection with a flywheel of a belt drive assembly mounted to the side of a harvester header, it will be appreciated by those skilled in the art that the principles of this invention may also be utilized in connection with any rotating member of a drive wherein an endless element is confined from removal by a gap created by the relative spacing of the rotating member and a component of the machine.

Operation

Figure 3:
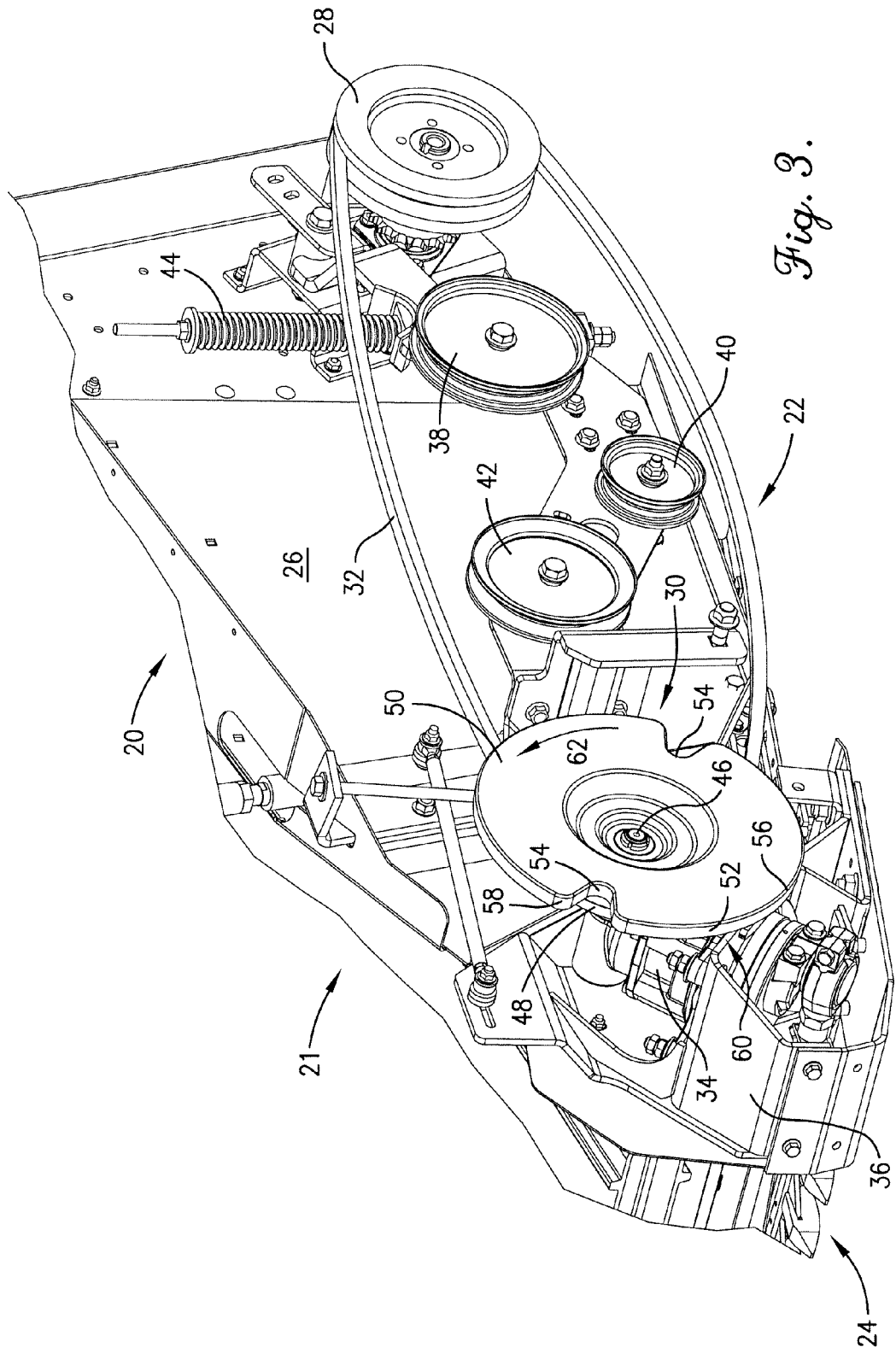
FIG. 3 is a fragmentary perspective view of the harvesting header similar to FIG. 1, but illustrating the belt removed from idler sheaves so as to be drivingly disengaged in an element-slack condition.

For belt removal operations, the belt 32 is sufficiently loosened so as to be drivingly disconnected from the driven pulley 48, as shown in FIG. 3. It will be appreciated by those of ordinary skill in the art that an example of a way to loosen the belt 32 from the drive assembly 22 would be to radially move idler pulley 38 opposite the direction in which it is biased by spring 44 and thereafter move the belt 32 from idler pulley 38, so that the belt 32 is in a slack condition.

Figure 4:
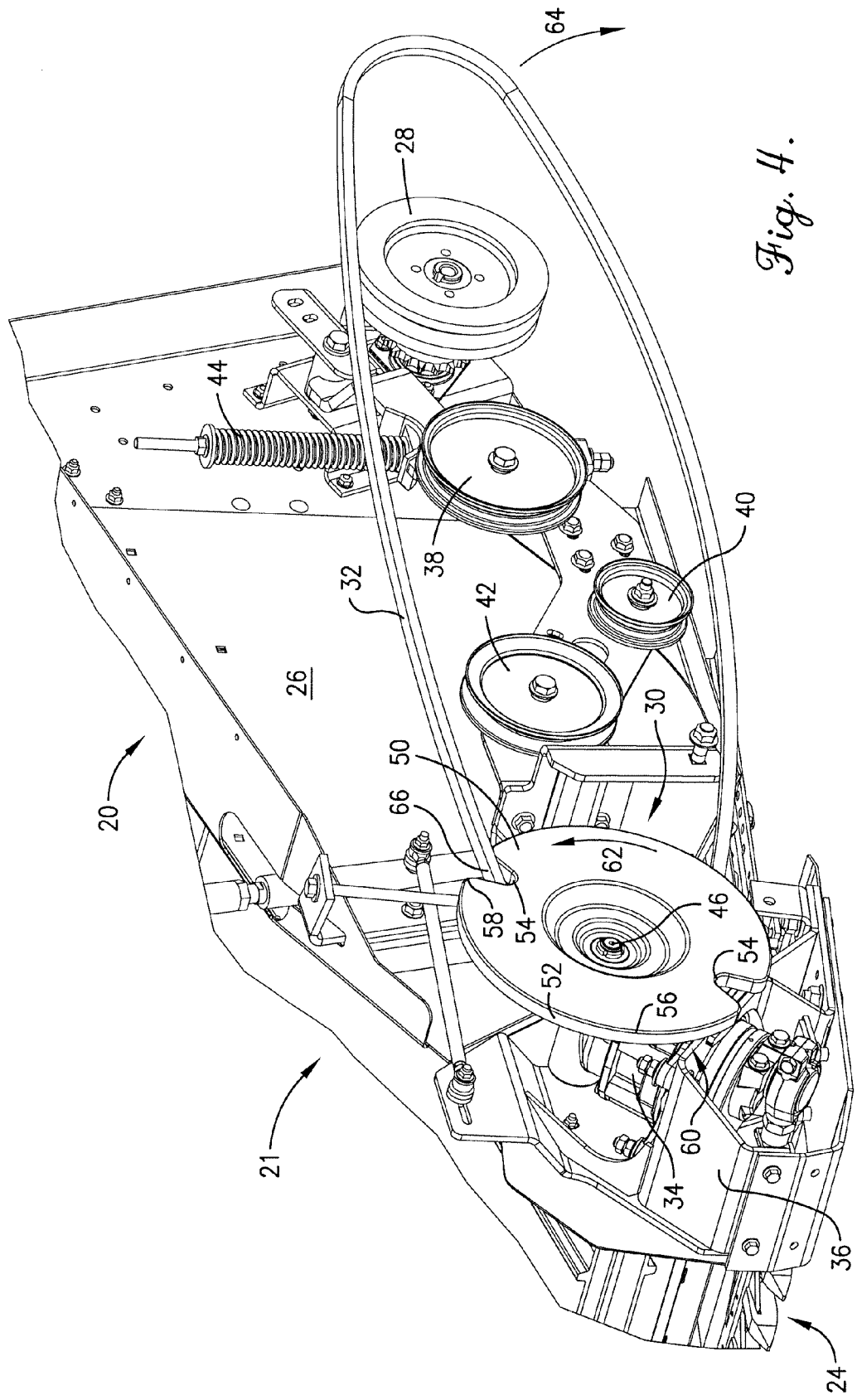
FIG. 4 is a fragmentary perspective view of the harvesting header similar to FIG. 3, but depicting a portion of the belt received in the notch of the flywheel and the section of the belt furthest from the flywheel moved laterally away from the rest of the assembly.
Figure 5:
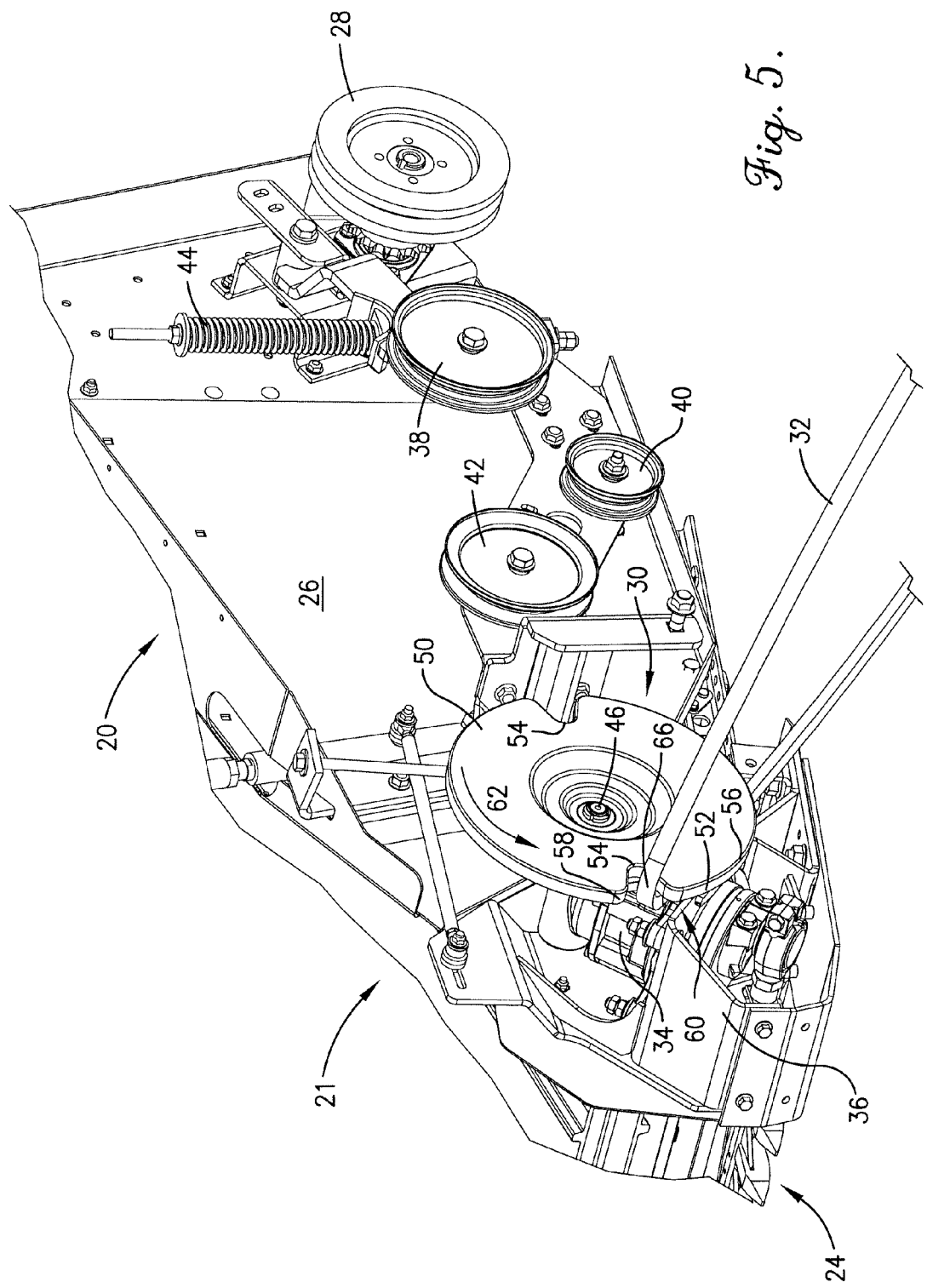
FIG. 5 is a fragmentary perspective view of the harvesting header similar to FIG. 4, but depicting the flywheel rotated so that the belt is beginning to move past the narrow gap.
Figure 6:
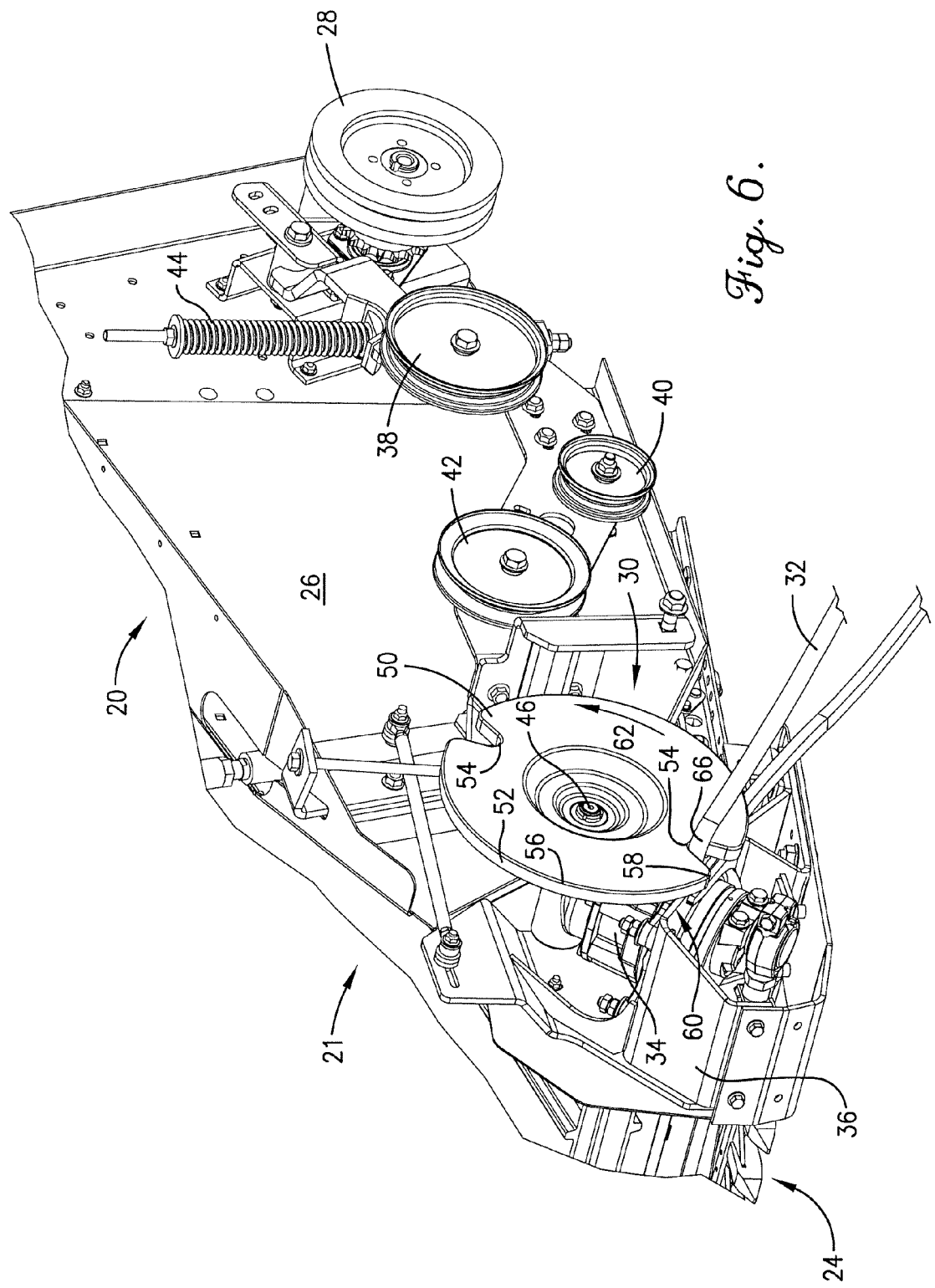
FIG. 6 is a fragmentary perspective view of the harvesting header similar to FIG. 5, but illustrating the flywheel further rotated as the belt continues to move along the narrow gap.

As shown in FIG. 4, a section of the belt 32 is moved away from the other components of the drive assembly 22 in the general direction of arrow 64. At least a portion of the belt 66 is placed within a notch 54 of the flywheel 50. As shown in FIG. 5, the flywheel 50 is then rotated in the direction of arrow 62, with the portion of the belt 66 received therein. This rotation moves the belt 32 past the gap 60 defined by the margin 37 of the header framework 36 and the proximal side of the flywheel 50b, as shown in FIGS. 2, 6, and 7. With the portion of the belt 66 having moved past the confining gap 60, the entire belt 32 is then removed from the remaining components of the drive assembly 22 in the general direction of arrow 68, as shown in FIG. 8.

In the illustrated embodiment, the belt 32 is flexible enough to be bendable and thereby selectively and partly extended in a generally transverse direction relative to the operating plane 33 occupied by the belt 32 when drivingly interconnecting the driving pulley 28 and the rotating assembly 30. As shown particularly in FIG. 5-8, the belt 32 can be bent into this generally transverse direction in order to more easily place the portion of the belt 66 within the notch 54.

It is noted that a "non-bendable" endless element (not shown) could be used in place of the belt 32 without departing from the present invention, as described above. In such a case, the "non-bendable" endless element (e.g., a chain) could be maintained in a generally planar orientation such that the element would be oriented at an angle relative to the flywheel during the rotation of the flywheel. Such a generally planar orientation (not shown), would be maintained throughout the rotation and removal process, as would be readily understood by those of ordinary skill in the art.

It is emphasized that operation described above relates specifically to the removal of the belt 32 from the drive assembly 22. However, the operation could be performed in reverse order to facilitate the similarly efficient installation of a new belt 32 on the drive assembly 22, as appreciated by one of ordinary skill in the art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. In an agricultural implement having a driveable mechanism for performing operations as the implement moves across a field, the improvement comprising:
   a drive operable to supply power to the driveable mechanism,
   said drive including a rotating assembly that comprises a stub shaft presenting spaced apart proximal and distal ends, a drive element fixed relative to the stub shaft so as to be spaced between the proximal and distal ends thereof, and a rotating member fixed relative to the stub shaft so as to be positioned distally from the drive element,
   said rotating member being larger in diameter than said drive element,
   said drive including an endless element wrapped at least partly around the drive element so as to be drivingly interconnected therewith, the endless element presenting a cross-sectional dimension; and
   a component spaced adjacent the rotating member to cooperatively present a gap therebetween, wherein the gap defines a maximum distance between the component and the rotating member that is less than the cross-sectional dimension of the endless element,
   said rotating member including a radially inwardly extending peripheral notch configured to receive at least a portion of a cross-section of the endless element therein so that, upon rotation of the rotating member with the at least a portion of the cross-section of the endless element received in the notch, the endless element is moveable past the component to thereby be removeable from the rotating assembly in the distal direction,
   said component presenting a gap-defining margin that is spaced radially from the axis of rotation of the rotating member,
   said notch having a deepest point that is radially closer to the axis of rotation of the rotating member than is said gap-defining margin by an amount that permits said portion of the cross-section of the endless element to clear said gap-defining margin of the component when said portion of the cross-section of the endless element is received within the notch and the notch is rotated past the gap-defining margin.

2. In the agricultural implement as claimed in claim 1; and
   structure proximal of the drive so that the rotating assembly projects outwardly from the structure with the drive element positioned between the structure and the rotating member,
   said structure generally preventing removal of the endless element from the rotating assembly in the proximal direction.

3. In the agricultural implement as claimed in claim 2,
   said structure including a wall extending alongside the drive, with the stub shaft projecting from the wall so that the distal end thereof is spaced from the wall.

4. In the agricultural implement as claimed in claim 3; and
   a harvesting header on which the driveable mechanism is supported,
   said wall defining a part of the harvesting header.

5. In the agricultural implement as claimed in claim 2,
   said rotating member and said drive element each presenting a respective diameter, with the diameter of the rotating member being greater than the diameter of the drive element,
   said endless element wrapping at least partly around the drive element to present two sections that each extend along a generally linear path from the drive element such that a distal projection of the paths onto the periphery of the rotating member defines intersecting points between which an arc is defined, said gap being defined outside the arc.

6. In the agricultural implement as claimed in claim 2, said component including a harvesting header framework; and a gearbox mounted on the framework and drivingly connected to the drive element, said structure including the gearbox.

7. In the agricultural implement as claimed in claim 1, said rotating member and said drive element each presenting a respective diameter, with the diameter of the rotating member being greater than the diameter of the drive element, said endless element wrapping at least partly around the drive element to present two sections that each extend along a generally linear path from the drive element such that a distal projection of the paths onto the periphery of the rotating member defines intersecting points between which an arc is defined, said gap being defined outside the arc.

8. In the agricultural implement as claimed in claim 7, said rotating member and said drive element being circular in shape.

9. In the agricultural implement as claimed in claim 1, said rotating member including at least a pair of said notches, wherein the notches are angularly spaced equidistantly around the periphery of the rotating member.

10. In the agricultural implement as claimed in claim 1, said endless element lying generally within an operating plane when drivingly interconnected to the drive element, at least part of said endless element extending outside of the operating plane when the at least a portion of the cross-section of the endless element is received in the notch.

11. In the agricultural implement as claimed in claim 10, said endless element being bendable so as to be selectively extended in a generally transverse direction relative to the operating plane and thereby positioned within the notch.

12. In the agricultural implement as claimed in claim 11, said endless element comprising a drive belt.

13. In the agricultural implement as claimed in claim 12, said drive element comprising a sheave.

14. In the agricultural implement as claimed in claim 1, said rotating member comprising a flywheel.

15. In the agricultural implement as claimed in claim 1, said component being spaced laterally proximally from the rotating member.

16. In the agricultural implement as claimed in claim 15, said margin being spaced radially inward from the periphery of the rotating member.

17. In the agricultural implement as claimed in claim 1, said rotating member including opposite lateral edges extending along the periphery, said edges being radiused so as to reduce the risk of damage to the endless element when the at least a portion of the cross-section of the endless element is received in the notch.

18. In the agricultural implement as claimed in claim 17, said periphery of the rotating member presenting spaced apart outermost segments, between adjacent ones of which the notch is defined, said notch cooperatively defining a junction with each of the adjacent ones of the segments, said junction being radiused so as to reduce the risk of damage to the endless element when the at least a portion of the cross-section of the endless element is received in the notch.

\* \* \* \* \*